United States Patent Office 2,696,479
Patented Dec. 7, 1954

2,696,479

MOLDING MATERIALS FOR THE PREPARATION OF FOUNDRY CORES AND MOLDS

Walter Ossenbrüggen and Erich Konrad, Leverkusen-Bayerwerk, Germany, assignors to Farbenfabriken Bayer, Leverkusen, Germany No Drawing. Application May 1, 1951, Serial No. 224,060

Claims priority, application Germany May 4, 1950

1 Claim. (Cl. 260—38)

The present invention relates to new materials for the preparation of foundry cores and moulds retaining their shape at temperatures prevailing on casting.

It is known (cf., for instance, "Modern Plastics," July 1950, page 79 seq.) to produce foundry cores and moulds suitable for steel, grey iron and metal casting, from fine-grained sand and powdered plastic binders capable of being hardened in the heat, with the addition of a hardening agent. The hitherto used methods are mostly carried out by mixing the sand with the resin and the hardening agent and applying the mixture onto the hot pattern units. After curing and solidifying the resulting cores and shell-like moulds are removed from the pattern. When the molten metal is poured in, the foundry mould assembled from the single mould-shells and cores, however, often loses its firm structural condition due to the destruction of the resin. Thus, the moulding sand is partially baked with the surface of the castings. Therefore, the castings have generally to be machined. The production of castings of complicated shape, particularly of those of smooth surfaces, according to the above-mentioned known processes cannot be accomplished or is not economical due to the high percentage of waste.

It is an object of the present invention to do away with these disadvantages. It is another object of the present invention to provide new moulding materials for the production of first quality mould-shells, cores and moulds for metal casting.

Further objects will be apparent as the following description proceeds.

In accordance with the present invention, cores and shell-like moulds being completely stable in respect to volume change also at casting temperatures, are obtained from moulding materials containing, besides sand and a heat-hardenable plastic binder, vitreous substances softening at temperatures substantially below the casting temperature.

Suitable plastic binders according to the invention are the well-known heat-hardenable resins, e. g. phenol formaldehyde resins, such as novolaks, urea formaldehyde resins, melamine resins etc. which may be employed in combination with the customary hardening agents, such as for instance, hexamethylene tetramine.

The term "vitreous substances" as hereinbefore used shall comprise the glass fluxes prepared by fusing silicon dioxide, with non volatile acids, e. g. phosphoric acid and/or boric acid, and metallic oxides, alkaline earth compounds and/or alkaline compounds generally employed in the manufacture of glass as basic components. The vitreous substances may also be prepared from minerals containing said compounds. However, in accordance with the present invention, vitreous substances may be preferably employed which soften on heating between about 400° C. and about 900° C., that means substances which soften at least 100° C. below the casting temperature applied. Best results are obtained on using vitreous substances, e. g. glasses, which in their softened or molten state, are furthermore capable of wetting and cementing or fritting the sand employed, i. e. the vitreous substances shall dissolve the surface of the sand grains within a very short period whereby their softening temperatures are raised due to the increase of the silicon dioxide content which involves the cohesion of the single sand grains. The above conditions are completely full-filled, for instance, by the use of silicates prepared by fusing quartz powder, sodium carbonate, calcium fluoride, barium carbonate and sodium fluoride. Appropriate glasses may be prepared by melting together the following components:

(a) 50 parts of calcined soda
    25 parts of quartz powder
    26 parts of titanium dioxide
    3 parts of barium sulphide
    4 parts of iron sulphate (b) 30 parts of calcined soda
    10 parts of potassium carbonate
    9 parts of calcium fluoride
    24 parts of quartz powder
    14 parts of barium carbonate
    5 parts of zinc oxide
    4 parts of cryolite
    3 parts of sodium fluoride (c) 19 parts of quartz powder
    26 parts of feldspar
    12 parts of calcined soda
    3 parts of calcium carbonate
    7 parts of cryolite
    33 parts of sodium tetraborate (d) 5 parts of sodium phosphate
    30 parts of sodium tetraborate
    33 parts of quartz powder
    8 parts of potassium carbonate
    17 parts of titanium dioxide
    2 parts of calcined soda (e) 34 parts of quartz powder
    28 parts of sodium tetraborate
    3 parts of sodium carbonate
    14 parts of lead oxide
    5 parts of boric acid
    5 parts of zinc oxide
    11 parts of manganese dioxide.

The manufacture of the shells and cores may be accomplished as described above, however, using as moulding material a mixture comprising a substantial amount of sand, a heat-hardenable plastic binder and a vitreous substance as defined above. A preferred embodiment for the preparation of the new type cores and shell-like moulds in accordance with the present invention consists in thoroughly mixing 2 to 10 parts, preferably 3 to 5 parts by weight, of a finely pulverized plastic binder containing 5 to 15%, preferably 10 to 12%, of the customarily used hardening agents, for instance, hexamethylene tetramine, and about 2 to 10 parts, preferably 3 to 5 parts by weight, of the above-defined vitreous substances in a finely powdered form, with 100 parts by weight of fine-grained, sifted quartz sand. For promoting the mixing process it may be of advantage to add one part by weight of a volatile organic solvent, for instance, petroleum. The mixture is applied to the pattern units heated to higher temperatures, for instance, to 200° C. After curing and solidifying the mass is stripped from the pattern units and, after assembling or pasting the shells and, if desired, the cores, the mould thus obtained is employed for casting.

The invention is further illustrated by the following examples without being restricted thereto, the parts being by weight.

Example 1

10 parts of a finely pulverized novolak consisting of 500 parts of phenol and 460 parts of 30% formaldehyde, 8 to 10 parts of a finely powdered glass flux prepared by fusing 50 parts of calcined soda, 25 parts of quartz powder, 26 parts of titanium dioxide, 3 parts of barium sulphide and 4 parts of iron sulphate are thoroughly mixed with 1.2 parts of hexamethylene tetramine and 160 to 210 parts of fine-grained sand for 1 to 2 hours with the addition of about 0.5 part of petroleum.

The resulting moulding material is spread upon the heated pattern plate surrounded with sheet iron and provided with a wax coating. Curing is effected at about 200° C. within 2 to 10 minutes. After solidification the mass representing a thin-walled mould-shell is removed from the plate. The casting mould is assembled from two of these shells thus obtained. By pouring in the molten metal, an accurately shaped casting of a smooth surface is obtained. Smaller parts of the moulding material sticking to the surface of the casting are easily removed by lightly tapping or, if necessary, by means of a sand blast apparatus.

In analogous manner cores may be produced by means of a hollow pattern.

*Example 2*

In the preceding example the glass flux may be replaced by any of the mixtures obtained by fusing the following compounds:

(a) 30 parts of calcined soda
    10 parts of potassium carbonate
    9 parts of calcium fluoride
    24 parts of quartz powder
    14 parts of barium carbonate
    5 parts of zinc oxide
    4 parts of cryolite
    3 parts of sodium fluoride (b) 19 parts of quartz powder
    26 parts of feldspar
    12 parts of calcined soda
    3 parts of calcium carbonate
    7 parts of cryolite
    33 parts of sodium tetraborate (c) 5 parts of sodium phosphate
    30 parts of sodium tetraborate
    33 parts of quartz powder
    8 parts of potassium carbonate
    17 parts of titanium dioxide
    2 parts of calcined soda (d) 34 parts of quartz powder
    28 parts of sodium tetraborate
    3 parts of sodium carbonate
    14 parts of lead oxide
    5 parts of boric acid
    5 parts of zinc oxide
    11 parts of manganese dioxide.

The above-defined mixtures likewise give rise to shell-like moulds and cores wherein accurately shaped castings may be prepared.

We claim:

A composition of matter for the preparation of foundry cores and moulds consisting essentially of approximately 100 to 200 parts of sand, a pulverized novolak, approximately 0.03 to 1.0 parts hexamethylene tetramine and approximately 1.0 to 15 parts glass obtained by fusing 50 parts of calcined soda, 25 parts of quartz powder, 25 parts of titanium dioxide, 3 parts of barium sulfide and 4 parts of iron sulfate.

References Cited in the file of this patent

UNITED STATES PATENTS

| Number | Name | Date |
|---|---|---|
| 1,959,179 | Snell | May 15, 1934 |
| 1,962,495 | Fisher | June 12, 1934 |
| 2,031,538 | Lemmerman | Feb. 18, 1936 |
| 2,156,457 | Long | May 2, 1939 |
| 2,322,667 | Seastone | June 22, 1943 |

FOREIGN PATENTS

| Number | Country | Date |
|---|---|---|
| 303,858 | Great Britain | Nov. 21, 1929 |
| 575,734 | Great Britain | Mar. 4, 1946 |

OTHER REFERENCES

FIAT Final Report No. 1168; "The 'C' Process of Making Molds and Cores for Foundry Use," by McCulloch, May 3, 1947, 10 pages.